United States Patent
Chou

(10) Patent No.: US 7,486,046 B2
(45) Date of Patent: Feb. 3, 2009

(54) BUCK/BOOST POWER CONVERTER FOR AN ELECTRONIC APPARATUS, METHOD THEREOF AND SYSTEM INCORPORATING THE SAME

(75) Inventor: Yi-Chung Chou, Taipei (TW)

(73) Assignee: ITE Tech., Inc., Hsinchu (TW)

( * ) Notice: Subject to any disclaimer, the term of this patent is extended or adjusted under 35 U.S.C. 154(b) by 366 days.

(21) Appl. No.: 11/197,906

(22) Filed: Aug. 4, 2005

(65) Prior Publication Data
US 2006/0262579 A1 Nov. 23, 2006

(30) Foreign Application Priority Data
May 18, 2005 (TW) .............................. 94116049 A

(51) Int. Cl.
*H01M 10/46* (2006.01)
(52) U.S. Cl. ..................................................... 320/107
(58) Field of Classification Search ................. 320/101, 320/107, 114, 140
See application file for complete search history.

(56) References Cited

U.S. PATENT DOCUMENTS 6,262,558 B1 *  7/2001  Weinberg ................... 320/101
2004/0239299 A1 * 12/2004  Vinciarelli .................. 323/282

* cited by examiner

Primary Examiner—Edward Tso
(74) Attorney, Agent, or Firm—J.C. Patents

(57) ABSTRACT

A boost/buck and DC/DC power converter with a charging function, a method thereof and a system incorporating the same are disclosed. The system uses an external power supply or a rechargeable battery as the power thereof. The power converter regulates the external power supply for producing the output voltage. An inductor-based booster/bucker further boosts or bucks the produced output voltage and the boosted or bucked output voltage charges the rechargeable battery.

6 Claims, 3 Drawing Sheets

BUCK/BOOST POWER CONVERTER FOR AN ELECTRONIC APPARATUS, METHOD THEREOF AND SYSTEM INCORPORATING THE SAME

CROSS-REFERENCE TO RELATED APPLICATION

This application claims the priority benefit of Taiwan application serial no. 94116049, filed on May 18, 2005. All disclosure of the Taiwan application is incorporated herein by reference.

BACKGROUND OF THE INVENTION

1. Field of Invention

The present invention relates to a power converter, and particularly to a DC/DC power converter with boosting, bucking and charging functions.

2. Description of the Related Art

A power converter is used for converting an input power supply voltage to one or more output voltages in many modes. "Switch mode" power converter have several types, for example, a boost power converter and a buck power converter.

With a low-power product application, switch mode power converter works either in boost mode or in buck mode. In boost mode, a voltage is boosted to a higher one; on the contrary, in buck mode, a voltage is bucked to a lower one.

In portable/handheld electronic products for example, the operation voltage of an internal circuit thereof is between 1.8V-2.5V. Therefore, for a Li-Ion battery (Lithium-Ion battery) used as a power supply, the power converter is operated in buck mode for reducing the power voltage of 4.2V-3.0V to a voltage of 2.8V-2.5V. On the other hand, for a 1.5V dry battery used as a power supply, the power converter is operated in boost mode for increasing the power voltage of 1.5V to a voltage of 1.8V-2.5V.

Referring to FIG. 1, it is a schematic block diagram showing a conventional switch mode power converter 10 with an inductor-based boost/buck circuit. The power circuit 10 includes a boost/buck timing control module (TCM) 15, an inductor L1, transistors M1 and M2 and switches S1-S4.

A battery 12 in FIG. 1 can be, for example, a NiMH battery (Nickel-Metal-Hydride battery), a NiCd battery (Nickel-Cadmium battery), a Li-Ion battery (Lithium-Ion battery) or a Li-polymer battery. Vb indicates the voltage of battery 12, herein.

According to a boost/buck selection signal CS, the boost/buck TCM 15 turns on or turn off the transistors M1 and M2, and the switches S1-S4, which dominates the power converter to be operated in boost mode or in buck mode. As the battery voltage Vb is higher than a required output voltage Vo, the power converter 10 is in buck mode to convert the voltage Vb into a lower output voltage Vo. While the battery voltage Vb is lower than a required output voltage Vo, the power converter 10 is in boost mode to convert the voltage Vb into a higher output voltage Vo.

In portable electronic products utilizing a rechargeable battery as the power supply thereof, a charger is needed to charge the rechargeable battery.

Referring to FIG. 2, it is a schematic block diagram showing a conventional charger 20 for charging a rechargeable battery 26. The charger 20 includes an external power supply 21, a battery status detection and charge-control module 23, an inductor L2 and transistors M3 and M4.

The external power supply 21 can be a power adaptor for converting AC into DC. An increasingly used external power supply for many handheld electronic products is a USB (universal serial bus) socket today. A handheld electronic product is just simply plugged in an USB socket on a computer for charging.

The battery status detection and charge-control module 23 is used for detecting electric energy status of the rechargeable battery 26 or the voltage Vb and providing a control signal to the transistors M3 and M4. Usually, an external power voltage Vex is higher than the rechargeable battery voltage Vb. Accordingly, the charger is in buck mode to provide the rechargeable battery 26 with a voltage required by charging. Moreover, as the rechargeable battery 26 is fully energized, the battery status detection and charge-control module 23 would turn off the transistor M3 to avoid an excessive charge, which may damage the rechargeable battery 26.

In the prior art, a power converter and a charger are two independent circuits, that is, the power converter is built in an independent IC (integrated circuit) and the charger in another independent IC.

Such circuit layouts with a power converter and a charger independently on each other have a simpler design advantage although, but it results in an increased circuit size and a high cost.

SUMMARY OF THE INVENTION

To overcome the above-described problem encountered by the conventional technique, there is a need to develop a power converter integrated with a charger to reduce the circuit size and the production cost thereof. The integrated power converter not only has a boost/buck function, but also serves for charging a rechargeable battery.

An embodiment of the present invention provides a power converter to convert an external power supply into an output voltage. In the power converter, a voltage regulator is coupled to the external power supply for regulating the external power supply into an output voltage. In addition, a booster/bucker module is coupled between the rechargeable battery and the output voltage for boosting/bucking the output voltage. The output voltage after boosting/bucking is further fed to the rechargeable battery for charging.

Another embodiment of the present invention provides a handheld product/system having multi powers of an external power supply and a rechargeable battery. The handheld product/system includes at least a power converter and a power circuit (i.e. a back-stage circuit). As the handheld product is connected to the external power supply, the power converter takes the external power supply for producing an output voltage. Further, the produced output voltage is used for charging the rechargeable battery through an inductor-based boosting/bucking circuit of the power converter. The output voltage then drives the power circuit.

A further embodiment of the present invention provides a method for converting voltages and charging. An external power supply is regulated into an output voltage by, for example, a voltage regulator. The output voltage is boosted or bucked, by, for example, an inductor-based boosting/bucking circuit. In the end, the output voltage after boosting/bucking is fed to the rechargeable battery for charging.

The booster/bucker in the embodiments of the present invention combines a charging function, which results in saving circuit size and production cost without affecting the functions of the above-described power converter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

The embodiments of the present invention provide a boost/buck DC/DC power converter integrating a charging function. As an external power supply is connected to the converter, the power converter produces an output voltage by means of regulating, and further charges a rechargeable battery using the produced output voltage. While no external power supply is connected to the converter, the power converter produces an output voltage by means of boosting/bucking the rechargeable battery. The power converter is suitable for a multi-power system, for example, a handheld electronic product. With a multi-power system, a rechargeable battery or an external power supply can be employed.

Figure 1:
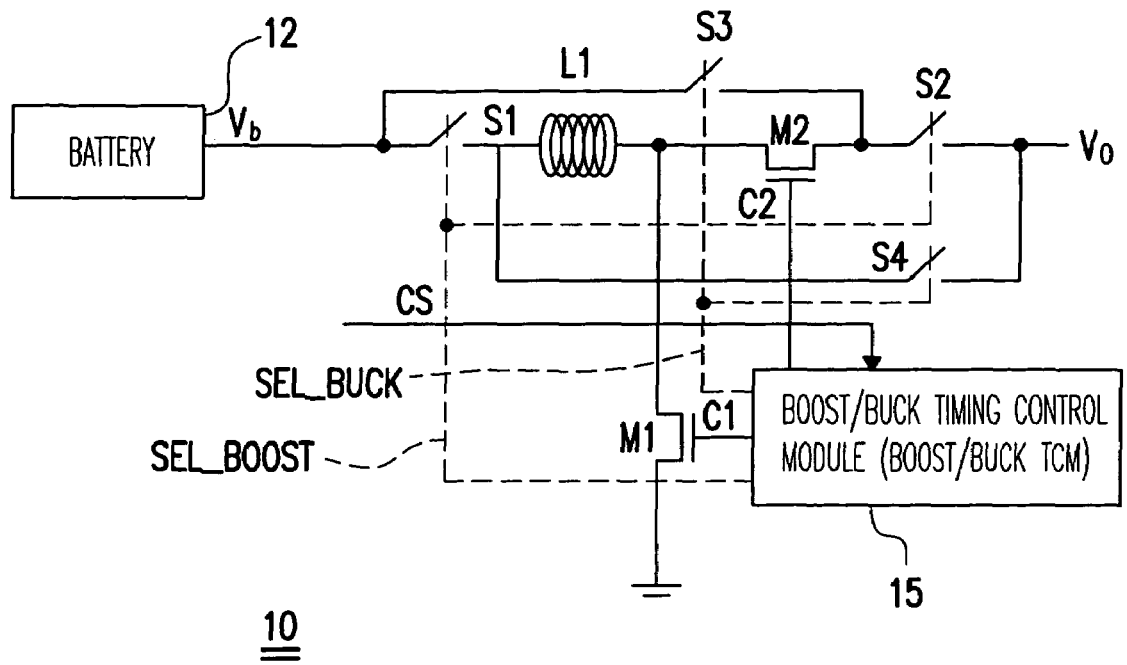
FIG. 1 is a schematic block diagram showing a conventional power converter.
Figure 2:
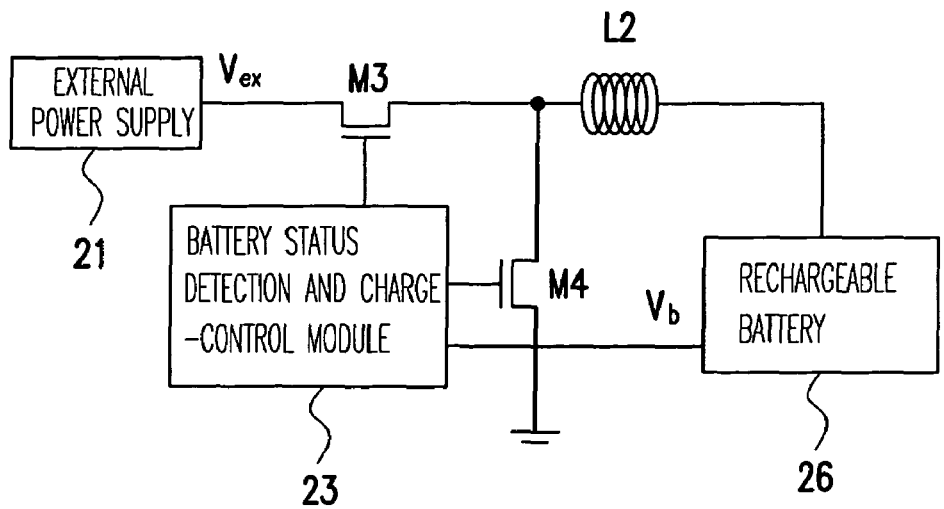
FIG. 2 is a schematic block diagram showing a conventional charger.
Figure 3:
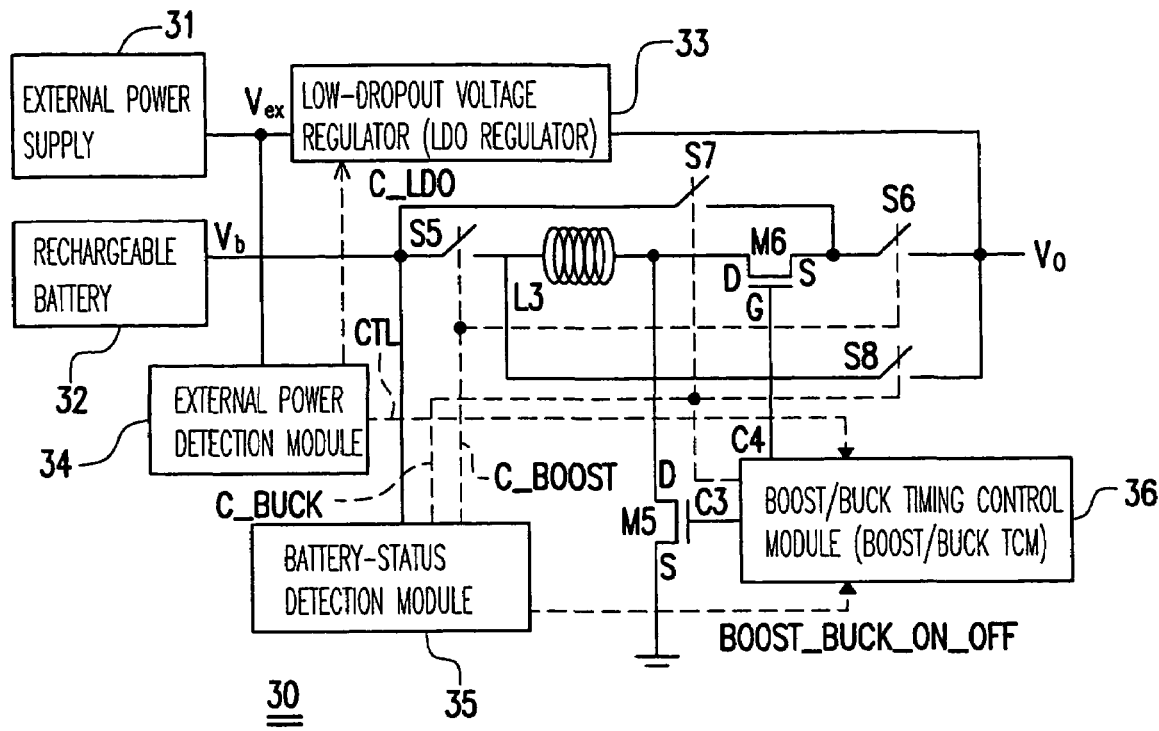
FIG. 3 is a schematic block diagram of a power converter according to an embodiment of the present invention.

Referring to FIG. 3, it schematically shows a boost/buck DC/DC power converter integrating a charger according to an embodiment of the present invention. A power converter 30 includes a low-dropout voltage regulator (LDO regulator) 33, an external power detection module 34, a battery-status detection module 35, a boost/buck timing control module (boost/buck TCM) 36, an inductor L3, transistors M5 and M6, and switches S5-S8. M5 and M6 herein are, but not limited to, NMOS (N-type metal oxide semiconductor) transistors. M5 and M6 can be other forms of transistors, for example, PMOS. Although the corresponded timing control signal needs to be modified with PMOS, all these are without departing from the scope or spirit of the invention.

For simplicity, in the description of the embodiment hereinafter, it assumes that the voltage Vex of the external power supply 31 is higher than the voltage Vb of the rechargeable battery and the output voltage Vo. As to the magnitudes of Vb and Vo, it depends on applications. For some applications, Vb>Vo; and in other cases, Vb<Vo. No matter which applications the power converter is suitable for, the embodiments of the present invention is applicable in these applications.

The external power supply 31 is, but not limited to, a power adaptor or a USB socket. The rechargeable battery 32 is, but not limited to, a NiMH battery, a NiCd battery, a Li-ion battery or a Li-polymer battery.

The LDO regulator 33 serves for regulating the external power supply 31 into an output voltage Vo.

The external power detection module 34 reveals the presence of the external power supply 31 and sends out a control signal C_LDO to the LDO regulator 33. As the external power supply 31 is not present, the control signal C_LDO demands the LDO regulator 33 to be off duty, and the output voltage Vo is accordingly produced by boosting/bucking the voltage Vb of the rechargeable battery 32. While the external power supply 31 is present, the control signal C_LDO demands the LDO regulator 33 to be on duty, and the output voltage Vo is accordingly produced by the external power supply 31 and the LDO regulator 33.

According to whether the external power supply the external power detection module 34 also sends out a boost/buck selection control signal CTL to the boost/buck TCM 36.

The battery-status detection module 35 detects the energy level or voltage of rechargeable battery 32. According to the detection result, the battery-status detection module 35 sends out a boost/buck and on/off signal BOOST_BUCK_ON_OFF to the boost/buck TCM 36. As the rechargeable battery 32 is fully energized, i.e. the voltage Vb reaches a upper limit, the boost/buck TCM 36 commands to stop charging the rechargeable battery 32 in response to the boost/buck and on/off signal BOOST_BUCK_ON_OFF. In this way, an excessively charging can be avoided for eliminating a potential damage risk of the rechargeable battery 32 and reduces electricity consumption. While the rechargeable battery 32 is not fully energized yet, the boost/buck and on/off signal BOOST_BUCK_ON_OFF asks the boost/buck TCM 36 to keep the on duty status, that is to start or continue to charge the rechargeable battery 32.

Figure 4:
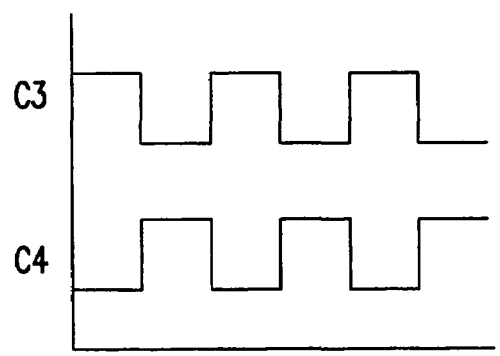
FIG. 4 is a timing control signal chart according to an embodiment of the present invention.

According to the control signal CTL sent from the external power detection module 34, the boost/buck TCM 36 produces transistor timing control signals C3 and C4 for turning on or off the transistor M5 and the transistor M6, respectively. FIG. 4 is a timing control signal chart of the control signals C3 and C4. Referring to FIG. 4, the control signals C3 and C4 are phase-inverted of each other. Certainly, the relationship between C3 and C4 other than FIG. 4 can be used in the embodiment of the present invention too.

The inductor L3 is coupled between the switch S5 and the transistor M6. The switch S5 is coupled between the rechargeable battery 32 and the inductor L3 for turning on or off the connection between the rechargeable battery 32 and the inductor L3. The switch S6 is coupled between the source of the transistor M6 and the output voltage Vo for turning on or off the connection between the source of the transistor M6 and the output voltage Vo. The switch S7 is coupled between the source of the transistor M6 and the rechargeable battery 32 for turning on or off the connection between the source of the transistor M6 and the rechargeable battery 32. The switch S8 is coupled between the inductor L3 and the output voltage Vo for turning on or off the connection between the inductor L3 and the output voltage Vo.

The gate of the transistor M5 receives the control signal C3 from the boost/buck TCM 36, the source thereof is grounded and the drain thereof is coupled to the drain of the transistor M6. The gate of the transistor M6 receives another control signal C4 from the boost/buck TCM 36, the source thereof is coupled to the switch S6 and S7 and the drain thereof is coupled to the drain of the transistor M5.

The operations of the power converter 30 and the equivalence circuits thereof corresponding to (1) Vb<Vo and (2) Vb>Vo are described as follows.

Figure 5:
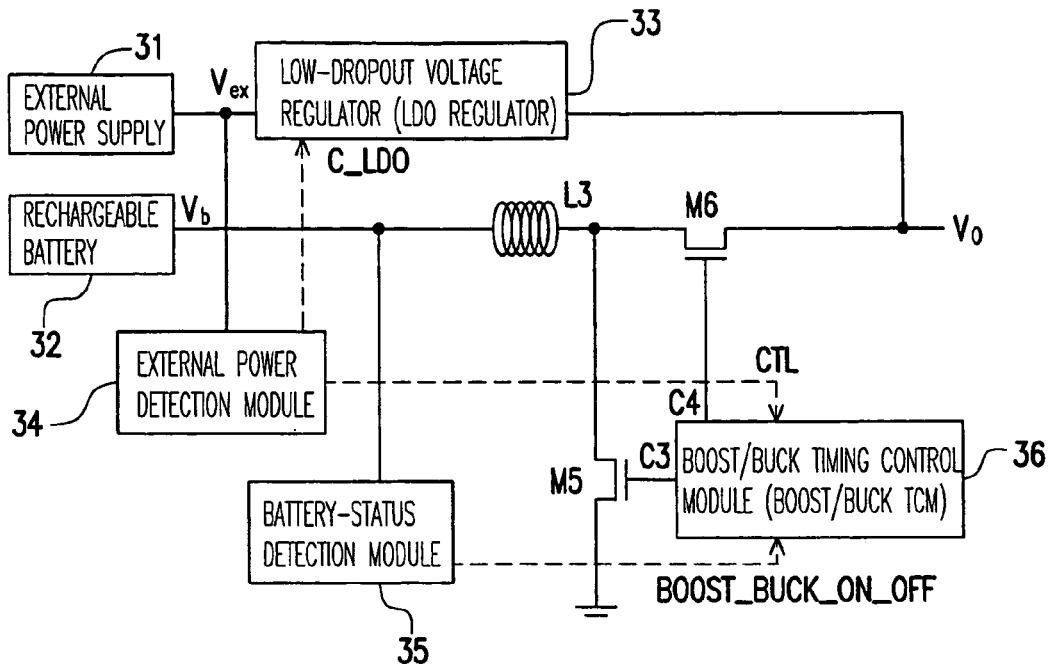
FIG. 5 is a schematic equivalence circuit of a power converter in the first mode according to an embodiment of the present invention.

Referring to FIG. 5, it is a schematic operation and equivalence circuit of the power converter 30 under Vb<Vo according to an embodiment of the present invention. Wherein there are two situations, a situation withthout external power supply 31 and another situation with external power supply 31.

(A) Without the External Power Supply 31.

As the external power supply 31 is not present, the output voltage Vo is produced by the rechargeable battery 32 in boosting mode. Meanwhile, the LDO regulator 33 is turned off according to the control signal C_LDO sent from the external power detection module 34.

The battery boost selection signal C_BOOST output from the battery-status detection module 35 turns on the switches S5 and S6. On the other hand, the battery buck selection signal C_BUCK output from the battery-status detection module 35 turns off the switches S7 and S8. According to the control signal CTL sent from the external power detection module 34, the boost/buck TCM 36 would produce the control signals C3 and C4 for turning on or off the transistors M5 and M6. As the transistor M6 is on, the rechargeable battery 32 produces the output voltage Vo through the inductor L3 and the transistor M6. FIG. 4 is a chart of the transistor timing control signals C3 and C4.

As the rechargeable battery 32 produces the output voltage Vo, the battery-status detection module 35 selectively does not provide the control signal BOOST_BUCK_ON_OFF to the boost/buck TCM 36. In addition, the power converter is working in boost mode at this moment, since a lower voltage Vb is boosted to a higher voltage Vo.

(B) With the External Power Supply 31.

As the external power supply 31 is present, the LDO regulator 33 is on duty according to the control signal C_LDO sent from the external power detection module 34. The external power supply 31 and the LDO regulator 33 produce the output voltage Vo. Meanwhile, the rechargeable battery 32 does not supply electricity during the external power supply 31 is present. According to an embodiment of the present invention, the produced output voltage Vo is further used for charging the rechargeable battery 32.

The battery boost selection signal C_BOOST output from the battery-status detection module 35 turns on the switches S5 and S6. On the other hand, the battery buck selection signal C_BUCK output from the battery-status detection module 35 turns off the switches S7 and S8. According to the control signal CTL sent from the external power detection module 34, the boost/buck TCM 36 would produce the control signals C3 and C4 for turning on or off the transistors M5 and M6. As the transistor M6 is on, the output voltage Vo through the inductor L3 and the transistor M6 charges the rechargeable battery 32. FIG. 4 is a chart of the transistor timing control signals C3 and C4.

During the rechargeable battery 32 is being charged herein, the battery-status detection module 35 provides the control signal BOOST_BUCK_ON_OFF to the boost/buck TCM 36. As the rechargeable battery 32 is fully energized, the boost/buck TCM 36 would turn off the transistor M6 according to the control signal BOOST_BUCK_ON_OFF, which leads to stop charging the rechargeable battery 32. The power converter is working in buck mode at this moment, since a higher voltage Vo is bucked to a lower voltage Vb.

Figure 6:
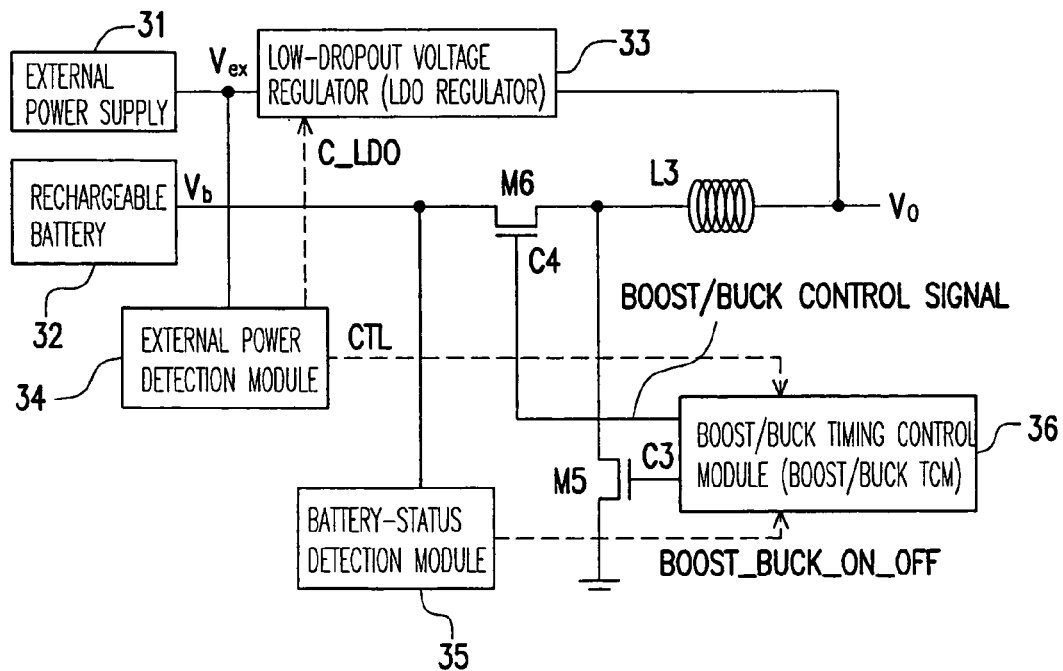
FIG. 6 is a schematic equivalence circuit of a power converter in the second mode according to an embodiment of the present invention.

FIG. 6 is a schematic operation and equivalence circuit of the power converter 30 under Vb>Vo according to an embodiment of the present invention. Wherein there are two situations, a situation without external power supply 31 and another situation with external power supply 31.

(A) Without the External Power Supply 31.

As the external power supply 31 is not present, the output voltage Vo is produced by the rechargeable battery 32 in bucking mode. Meanwhile, the LDO regulator 33 is turned off according to the control signal C_LDO sent from the external power detection module 34.

The battery boost selection signal C_BOOST output from the battery-status detection module 35 turns on the switches S7 and S8. On the other hand, the battery buck selection signal C_BUCK output from the battery-status detection module 35 turns off the switches S5 and S6. According to the control signal CTL sent from the external power detection module 34, the boost/buck TCM 36 would produce the control signals C3 and C4 for turning on or off the transistors M5 and M6. As the transistor M6 is on, the rechargeable battery 32 produces the output voltage Vo through the inductor L3 and the transistor M6. FIG. 4 is a chart of the transistor timing control signals C3 and C4.

As the rechargeable battery 32 produces the output voltage Vo, the battery-status detection module 35 selectively does not provide the control signal BOOST_BUCK_ON_OFF to the boost/buck TCM 36. In addition, the power converter is working in buck mode at this moment, since a higher voltage Vb is bucked to a lower voltage Vo.

(B) With the External Power Supply 31.

As the external power supply 31 is present, the LDO regulator 33 is on duty according to the control signal C_LDO sent from the external power detection module 34. The external power supply 31 and the LDO regulator 33 produce the output voltage Vo. Meanwhile, according to an embodiment of the present invention, the produced output voltage Vo is further used for charging the rechargeable battery 32.

The battery boost selection signal C_BOOST output from the battery-status detection module 35 turns on the switches S7 and S8. On the other hand, the battery buck selection signal C_BUCK output from the battery-status detection module 35 turns off the switches S5 and S6. According to the control signal CTL sent from the external power detection module 34, the boost/buck TCM 36 would produce the control signals C3 and C4 for turning on or off the transistors M5 and M6. As the transistor M6 is on, the output voltage Vo through the inductor L3 and the transistor M6 charges the rechargeable battery 32. FIG. 4 is a chart of the transistor timing control signals C3 and C4.

During the rechargeable battery 32 is being charged herein, the battery-status detection module 35 provides the control signal BOOST_BUCK_ON_OFF to the boost/buck TCM 36. As the rechargeable battery 32 is fully energized, the boost/buck TCM 36 would turn off the transistor M6 according to the control signal BOOST_BUCK_ON_OFF, which leads to stop charging the rechargeable battery 32. The power converter is working in boost mode at this moment, since a higher voltage Vo is bucked to a lower voltage Vb.

The produced output voltage Vo in the embodiment of the present invention can be used for driving a power circuit (i.e. a back-stage circuit) of handheld electronic products.

the structures or configurations of the LDO regulator 33, the external power detection module 34, the battery-status detection module 35 and the boost/buck TCM 36 in the embodiment of the present invention is not specially limited.

The embodiment of the present invention covers a variety of the relationship between the rechargeable battery voltage Vb and the output voltage Vo, wherein the external power supply voltage Vex is assumed higher than the output voltage Vo. Thus, the embodiment of the present invention is able to fit various applications. As an external power supply is not present, the LDO regulator is off duty. Meanwhile, if the rechargeable battery voltage Vb is higher than the output voltage Vo, the power converter is switched into the buck mode and the inductor-based bucker circuit provides the output voltage Vo. While the rechargeable battery voltage Vb is lower than the output voltage Vo, the power converter is switched into the boost mode and the inductor-based booster circuit provides the output voltage Vo.

On the other hand, as an external power supply is present, the LDO regulator is on duty and the output voltage Vo is produced by the external power supply voltage Vex through the LDO regulator. Meanwhile, if the rechargeable battery voltage Vb is higher than the output voltage Vo, the power converter is switched into the boost mode and the inductor-based booster circuit produces a current or a voltage to charge the rechargeable battery. While the rechargeable battery voltage Vb is lower than the output voltage Vo, the power converter is switched into the buck mode and the output voltage Vo would through the inductor-based booster circuit produce a cuurent or a voltage to charge the rechargeable battery.

In another embodiment of the present invention, a multi-power handheld product/system using an external power and a rechargeable battery is provided. The handheld product/system includes at least a power converter and a back-stage circuit. The handheld product can be, but not limited to, a mobile phone, a PDA (personal digital assistant), a smart phone, a handheld game player and a portable multimedia player (PMP). As the handheld product is not connected to the external power, the inductor-based booster/bucker circuit in the power converter takes a boost mode or a buck mode and the rechargeable battery through the booster/bucker circuit to produce an output voltage. While the handheld product is connected to the external power, the power converter uses the external power to produce an output voltage; moreover, the produced output voltage is further used to charge the rechargeable battery through the inductor-based booster/bucker circuit. The back-stage circuit is driven by the output voltage.

In a further embodiment of the present invention, a method for converting voltages and charging is provided. With the method, a LDO regulator is used for regulating the external power into an output voltage; an inductor-based booster/bucker circuit is used for boosting/bucking the output voltage; the output voltage is further boosted/bucked to charge the rechargeable battery.

It can be seen from the above described that the embodiments of the present invention integrate a charger and an inductor-based booster/bucker circuit. In this way, the circuit size and the whole production cost are reduced.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A power converter, used for converting an external power supply into an output electric parameter, comprising:
    a voltage regulator, used for regulating the external power supply into the output electric parameter;
    a booster/bucker module, coupled between a rechargeable electric-energy storing unit and the output electric parameter;
    a first detection module, used for detecting the presence of the external power supply and sending out a detection result to the voltage regulator;
    a timing control module (TCM), used for outputting a first timing signal and a second timing signal to the booster/bucker module according to the detection result; and
    a second detection module, used for detecting the electric-energy status of the rechargeable electric-energy storing unit, sending out an on/off control signal to the timing control module (TCM) and sending out a boost mode signal and a buck mode signal to control the booster/bucker module for boosting or bucking operation;
    wherein, the output electric parameter is boosted or bucked by the booster/bucker module, and then the electric-energy is stored in the rechargeable electric-energy storing unit;
    wherein, as the external power supply is present, the detection result controls the voltage regulator to be on duty; while the external power supply is not present, the detection result controls the voltage regulator to be off duty; and
    wherein, as the rechargeable electric-energy storing unit is fully energized, the on/off control signal commands the TCM to turn off the booster/bucker module.

2. The power converter as recited in claim 1, wherein the booster/bucker module comprises:
    an inductor component, having a first end and a second end;
    a first transistor, having a drain coupled to the second end of the inductor component, a gate for receiving the first timing signal and a source grounded;
    a second transistor, having a drain coupled to the second end of the inductor component, a gate for receiving the second timing signal and a source;
    a first switch, used for controlling the rechargeable electric-energy storing unit to couple the first end of the inductor component or not to couple;
    a second switch, used for controlling the source of the second transistor to couple the output electric parameter or not to couple;
    a third switch, used for controlling the source of the second transistor to couple the rechargeable electric-energy storing unit or not to couple;
    a fourth switch, used for controlling the first end of the inductor component to couple the output electric parameter or not to couple.

3. The power converter as recited in claim 1, wherein the external power supply comprises at least a voltage adaptor and an USB (universal serial bus) socket equipped on a computer.

4. The power converter as recited in claim 1, wherein the rechargeable electric-energy storing unit comprises at least a NiMH battery, or a NiCd battery, or a Li-ion battery, or a Li-polymer battery.

5. A system, using an external power supply and a rechargeable battery, comprising:
    a power converter, used for producing an output voltage by means of the external power supply, wherein the output voltage is further used to charge the rechargeable battery; and
    a back-stage circuit (power circuit) driven by the output voltage;
    wherein the power converter comprises:
        an external power detection module, used for detecting the presence of the external power supply and sending out a first control signal;
        a battery-status detection module, used for detecting the electric-energy status of the rechargeable battery and sending out a second control signal;
        a LDO regulator (low-dropout voltage regulator), used for regulating the external power supply into the output voltage, wherein the LDO regulator is controlled by the first control signal for being off duty or being on duty;
        a timing control module (TCM), used for outputting a timing signal; and
        a booster/bucker module, used for boosting or bucking the output voltage according to the timing control signal, wherein the boosted or bucked output voltage is further used for charging the rechargeable battery;
    wherein, as the rechargeable battery is fully energized, the second control signal commands the TCM to turn off the booster/bucker module to stop charging the rechargeable battery.

6. A method for converting voltages and charging, comprising the following steps:
- regulating an external power supply into an output voltage;
- performing a boost operation or a buck operation;
- charging a rechargeable battery by the boosted or bucked output voltage;
- detecting whether the external power supply is present or not;
- producing a first control signal if the external power supply is present;
- performing a timing control operation in response to the first control signal, wherein a boost operation or a buck operation on the output voltage is conducted by the timing control operation;
- detecting the electric-energy status of the rechargeable battery; and
- stopping to charge the rechargeable battery if the rechargeable battery is essentially energized.

* * * * *